Patented Jan. 24, 1933

1,895,376

UNITED STATES PATENT OFFICE

FRANK M. CLARK, OF PITTSFIELD, MASSACHUSETTS, ASSIGNOR TO GENERAL ELECTRIC COMPANY, A CORPORATION OF NEW YORK

ELECTRIC CAPACITOR

No Drawing.   Application filed February 1, 1930. Serial No. 425,357.

The present invention relates to electrical capacitors and comprises in particular capacitors provided with improved dielectric materials whereby and as a consequence of my invention the electrical capacity, dielectric strength and other properties of such capacitors is materially improved.

In accordance with my invention, organic esters of high inductive capacity, are employed as dielectrics in capacitors, preferably after suitable preliminary treatment, either alone or in conjunction with other dielectric materials, such for example, as paper.

Ester phosphates, such as tricresyl phosphates, constitute a preferred embodiment of my invention.

My invention will be set forth with greater particularity in the appended claims. For a better understanding of my invention the following illustrative examples are enumerated.

Tricresyl phosphate, such as obtainable in the open market, is purified by filtration through a suitable adsorbent material, such as fuller's earth, silica gel, or the like, in order to remove water and such minute quantities of other impurities as are likely to be present even in refined tricresyl phosphate. A column of fuller's earth about three feet high may be employed. Before such treatment the dielectric constant of the material is not uniform but after treatment with fuller's earth its dielectric constant is uniformly about 7. The power factor of the phosphate is lowered somewhat by fuller's earth treatment and the electric resistivity is increased by such treatment. Moreover, in some cases the resistivity of the unpurified phosphate is very low, whereas after treatment it is uniformly high, commonly being about 1.0 to 2.5 x $10^9$ ohms per c. m. cube. Other esters containing a phosphoric acid radical may be similarly treated and employed as dielectric media in capacitors, as for example, tributyl phosphate, triethyl phosphate and triphenyl phosphate.

Capacitors may be provided with a dielectric of purified organic ester in the same way as heretofore practiced with oil, or other liquid dielectric material. For example, capacitors having sheets of paper interposed between the electrode plates may be impregnated with purified tricresyl phosphate under vacuum at room temperature.

The advantages of electric capacitors in which my invention is embodied may better be understood from the following consideration of a form of commercial capacitor which is employed on 220 volt power circuits. Such capacitor has a size of about 3½ x 4¼ x 5 inches. It contains aluminum foil electrodes separated by paper, three thicknesses of .4 mil paper being employed. When impregnated with mineral oil such capacitor has a capacity of 18 microfarads. When impregnated with tricresyl phosphate such capacitor has a capacity of 35 microfarads, an increase of about 95%.

If, on the other hand, no increase of electric capacity is desired, the physical size of capacitors impregnated with tricresyl phosphate or the like may be reduced. A one microfarad capacitor for 220 volt alternating current application, impregnated with mineral oil, has a dimension of about 4 cu. in. A one microfarad capacitor impregnated with tricresyl phosphate has a cubical dimension of 2.1 cu. in.

As dielectric material I may use in accordance with my invention other ester compounds of high specific inductive capacity and treat them in a similar manner. For example, a class of phthalates, such as dibutyl, diamyl or diethyl phthalates may be employed as dielectric media in capacitors. All these compounds are organic esters containing a phthalic acid radical. In some cases glycerol fatty acid esters may be employed, such for example as triacetin. I prefer to employ esters which are liquid at ordinary temperatures.

The advantages of my invention may be obtained to their fullest extent in connection with electric capacitors containing kraft paper, that is, paper made from sulphate wood pulp, a lower power factor and a longer life at the usual operating voltages being obtained with such capacitors than with capacitors containing linen paper. In United States Patent 1,850,702, patented March 22, 1932 in the name of Amos L. Allen, and assigned to the same assignee as the present application, is described kraft paper having a thickness less than .5 mil. I prefer to employ for the purpose of my invention a dielectric between the plates of a capacitor consisting of three layers of .4 mil kraft paper.

The ester dielectric may be used with various forms of absorbent solid dielectric material other than paper. For example, there may be employed with success as electrode material aluminum foil which has been oxidized by chemical treatment with or without the conjoint action of electrolysis to produce on the aluminum foil a layer of aluminum oxide.

When paper is used as a dielectric between the plates of the condenser it is desirable in some cases to first impregnate the paper either before or after the assembly of the capacitor, with a water solution of an inorganic salt, such as calcium sulphate or sodium phosphate, the paper preferably then being dried in air. A capacitor containing dielectric material constituted of paper thus impregnated is filled with tricresyl phosphate, or other phosphate ester in accordance with my invention. This prior treatment of the paper decreases the power factor of a capacitor containing it without materially affecting its electrical capacity.

In a copending application, Serial No. 425,359 filed February 1, 1930, I have described and claimed as a dielectric for electric devices phosphate esters which have been heat-treated to modify their dielectric properties.

The electrodes or plates of a capacitor are most aptly identified by the term armatures and are so identified in the appended claims.

The term "capacitor" as used in this specification and in the claims does not cover a transformer or a switch.

What I claim as new and desire to secure by Letters Patent of the United States, is:

1. An electric capacitor comprising electrode plates, and kraft paper interposed between said plates, said paper being impregnated with tricresyl phosphate which has a resistivity of at least about $1 \times 10^9$ ohms per centimeter cube.

2. An electric capacitor comprising electrode plates, paper containing an inorganic salt interposed between said plates and an organic ester having a dielectric constant of at least about 6 and a resistivity of at least about $1 \times 10^9$ ohms per centimeter cube permeating said paper.

3. An electric capacitor comprising electrode plates, a dielectric interposed between said plates comprising paper containing an inorganic salt and being impregnated with tricresyl phosphate.

4. An electric capacitor having in combination juxtaposed capacitor armatures which during operation are subjected respectively to different electric potentials, and a liquid organic ester located between said armatures, said ester having a dielectric constant of at least about 6 and a resistivity of at least $1 \times 10^9$ ohms per centimeter cube.

5. An electric capacitor having in combination juxtaposed capacitor armatures which during operation are subjected respectively to different electric potentials, and a dielectric located between said armatures comprising a liquid organic ester having a phosphoric acid radical.

6. An electric capacitor having in combination juxtaposed capacitor armatures which during operation are subjected respectively to different electric potentials, and a dielectric located between said armatures comprising tricresyl phosphate.

7. An electric capacitor having in combination juxtaposed capacitor armatures which during operation are subjected respectively to different electric potentials, and a dielectric located between said armatures comprising a liquid organic ester having a phthalic acid radical.

8. An electric capacitor having in combination juxtaposed capacitor armatures which during operation are subjected respectively to different electric potentials, and a dielectric located between said armatures comprising dibutyl phthalate.

9. An electric capacitor having in combination juxtaposed capacitor armatures which during operation are subjected respectively to different electric potentials, and a dielectric located between said armatures comprising diamyl phthalate.

In witness whereof I have hereunto set my hand this 29th day of January, 1930.

FRANK M. CLARK.